Patented Mar. 16, 1954

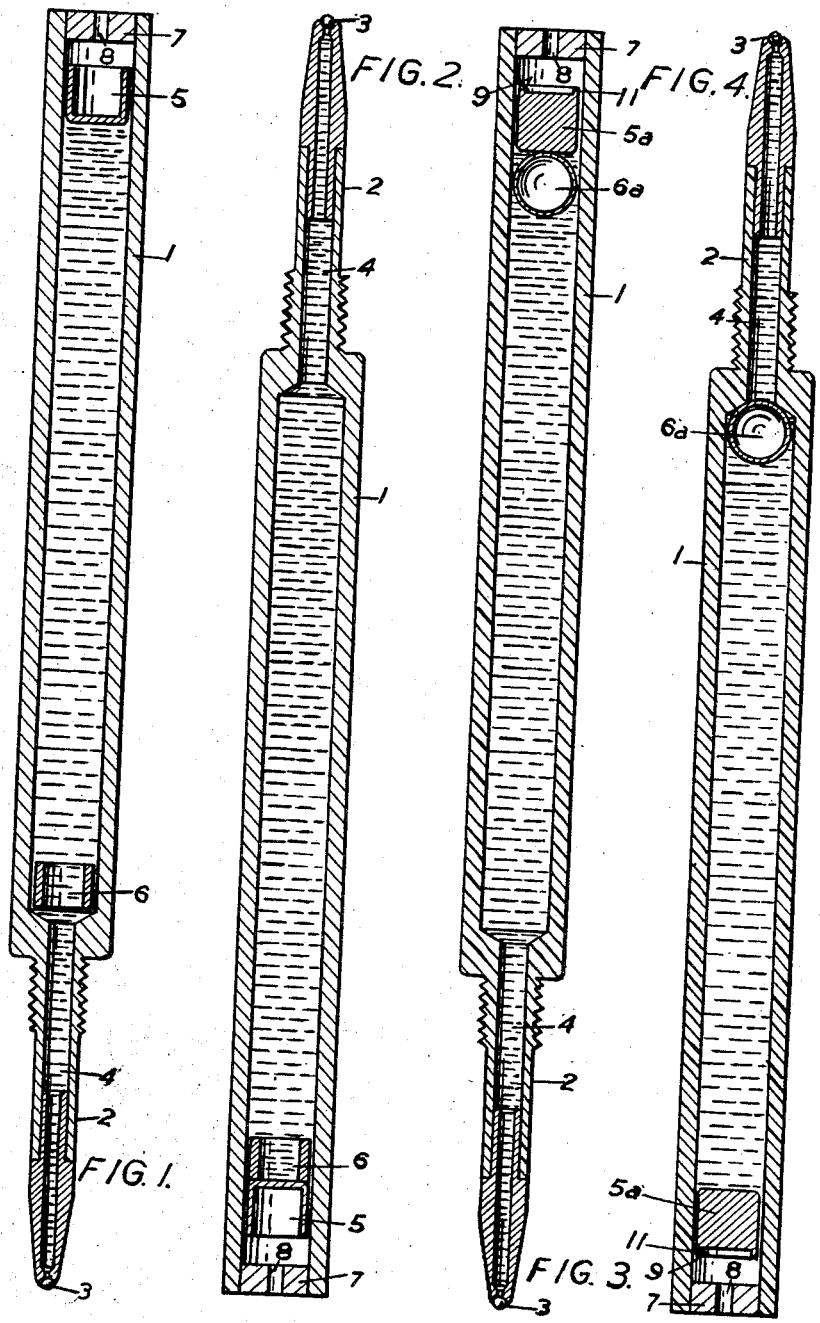

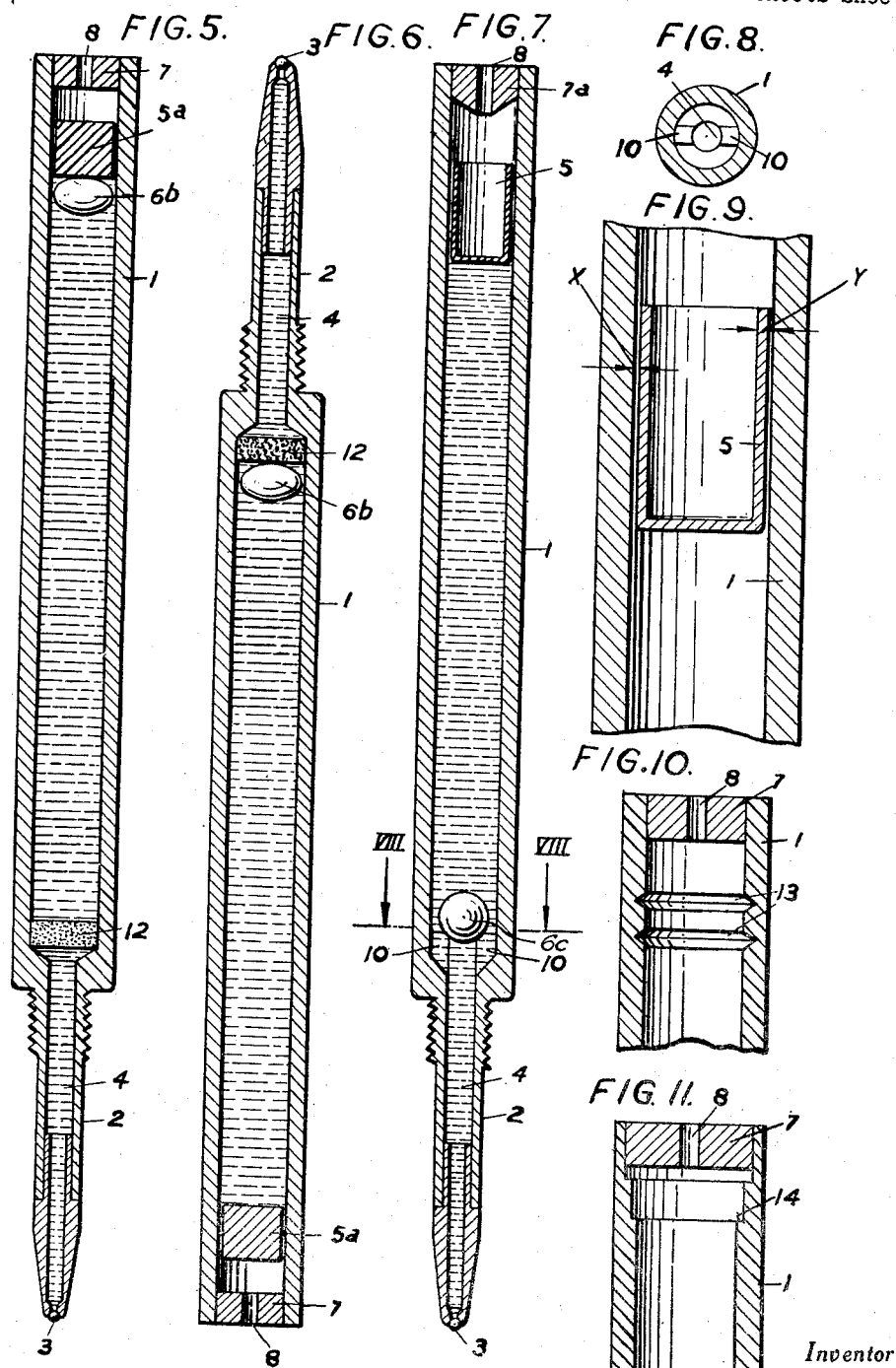

2,672,127

UNITED STATES PATENT OFFICE 2,672,127

WRITING INSTRUMENT

Hans Reinhard Fehling, London, England, assignor to Compania Uruguaya de Fomento Industrial S. A., Montevideo, Uruguay Application July 12, 1949, Serial No. 104,242

Claims priority, application Great Britain July 15, 1948

17 Claims. (Cl. 120—42.4)

This invention is concerned with an improved reservoir specifically intended for reservoir writing instruments of the ball tip type wherein the writing extremity comprises a writing ball rotatably housed in and partly protruding from a socket or housing, which ball is supplied with ink from a reservoir by means of at least one feed duct or passage which communicates with the base of the socket or housing so that, as the ball is rotated by being moved over and in contact with a surface such for example as that of a sheet of paper, a thin film of ink is carried by the ball through the narrow gap between it and its housing and is deposited as a trace on the said surface. In general satisfactory writing instruments of this type have been manufactured and have been equipped with a vented reservoir in the form of a small bore tube.

Practical considerations in a writing instrument place an upper limit on the capacity of such a reservoir, whereas it is desirable to provide an instrument of the type specified with a reservoir of appreciable capacity. One problem that is encountered in this provision of a large capacity reservoir is that of preventing the ingress of air, avoiding leakage of ink, and avoiding an air lock (causing the cessation of ink flow) as the ink is gradually used up in writing. Theoretically it is possible to overcome these difficulties by employing an ink reservoir which resembles an open-ended cylinder and placing upon the ink a piston-like float, this float being such a fit within the cylinder that on the one hand it prevents the ingress of air and the leakage of ink, while on the other hand it is capable of moving down the cylinder as the ink is used up. The commercial manufacture of such a reservoir on a repetition basis, however, presents difficulties. Specifically, it is difficult to ensure that the float has the correct buoyancy and that the gap between its peripheral surface and the interior surface of the reservoir is of the correct dimension. Considering in the first place conditions obtaining when the writing instrument is in the writing attitude, viz. with the float uppermost, it will be appreciated that the float will be immersed in the ink to a greater or lesser extent according to its buoyancy. It will also be appreciated that strong capillary forces will be set up in the narrow radial gap between the exterior peripheral surface of the float and the interior surface of the surrounding walls of the reservoir. These capillary forces will cause the ink to rise within the gap to a height greater than that to which they would rise merely by virtue of displacement of ink by the float; the ink in the gap necessarily terminates in a meniscus. The location of this meniscus will therefore be affected by several factors including the buoyancy of the float and the width of the gap (the narrower the gap the stronger the capillary forces and the higher the location of the meniscus). Indeed conditions may be such that the meniscus, instead of being located within the gap below or at the top end of the float, may extend from the top end surface of the float to a higher level on the reservoir walls. If this happens there is the danger of ink seepage, particularly if there is an ink film on the reservoir walls and the formation of such an ink film in inevitable as the reservoir is gradually emptied. However, the instrument spends only a part of its life in the writing attitude, for when not in use it is commonly carried ball uppermost. In this attitude, if the float is buoyant it tends to rise in the ink with a consequent risk of seepage past the float. It will therefore be appreciated that accuracy in manufacture must be of a very high degree and it has been found that an error of 1% in the weight of the float may under certain circumstances produce seepage in one or other attitude of the instrument.

A specific object of the present invention is to provide an improved instrument of the type specified, in which the above mentioned difficulties are obviated or minimised.

With this and other objects in view the invention provides a reservoir writing instrument of the type specified having a reservoir of tubular internal form with a cross sectional area of not more than 40 and not less than 5 sq. mm., charged with a suitable ink, and containing a reservoir sealing member which is a sliding fit in the reservoir and normally moves along the reservoir in contact with the ink as the latter is used up in writing, characterised in that the reservoir further incorporates means for compensating any tendency of the sealing member, in any attitude of the instrument, to movement towards the ball other than the aforesaid normal movement and any tendency of the sealing member to movement away from the ball when the instrument is inverted. The provision of this means permits of wide manufacturing tolerances, as regards size and weight, in the sealing member without encountering undue risk that when the instrument is in the writing attitude the sealing member will descend towards the ball and the risk that when the instrument is in the inverted attitude the sealing member will drop out of the ink. It is preferred that the reservoir shall be of circular or other cross section with a smooth interior. It is necessary to avoid the use of a reservoir of angular cross section or any reservoir having sharp corners as in a square in order to avoid the phenomenon known as capillary creep and for this reason if the section of the reservoir is not circular or oval but is for example of corrugated formation it should not have any curves forming a radius of less than 1 mm.

A suitable ink is one which is suitable for use in a writing instrument of the type specified, primarily in that it gives an even trace and does not result in the ball seizing or getting clogged up or gummed up, and in that its viscosity is not so high as to prevent an adequate ink feed to the ball when the instrument is being used. The present state of knowledge indicates that a suitable ink must be oleaginous containing a dye stuff which gives the required colour or shade, its viscosity preferably being not less than 15 poises at all temperatures likely to be attained by the instrument in normal use (e. g. not less than 15 poises at 37° C.).

Specifically the aforesaid means may be a balancing member which is located in the ink space beneath the sealing member and is free to move therein towards and away from the sealing member under the influence of gravity as the attitude of the instrument is changed.

The invention further provides a reservoir suitable for a reservoir writing instrument of the type specified which is of tubular internal form with an internal cross sectional area of not more than 40 and not less than 5 sq. mm. and contains a reservoir sealing member which is a sliding fit in it at the end of the ink space remote from the ball and a balancing member which is free to move in the ink space and has a bulk density differing from that of the sealing member, the construction and disposition of the parts being such that when the reservoir is charged with a suitable ink of a density intermediate the bulk densities of the sealing and balancing members, a meniscus is formed between the sealing member and the inner surface of the reservoir and the sealing member is maintained in stable equilibrium at that end of the ink column remote from the ball in all attitudes of the instrument. The bulk density of the sealing member or balancing member is ascertained by dividing the weight of that member (in air) by the over-all volume of the member (including the volume of any cavity therein which is not filled with ink): thus for example a bulk density of 1 gr./cc. would indicate that the member would just float in water.

While the sealing member may have a bulk density which is greater than that of the balancing member it is preferred that this bulk density shall be less than that of the balancing member.

It has been ascertained that commercially satisfactory results are obtained if the radial clearance between the sealing member and the interior surface of the reservoir is between 0.01 mm. and 0.20 mm. (assuming the clearance to be equal all round the sealing member) but best results are obtained if the clearance is between 0.05 mm. and 0.08 mm.

A further and important feature of the invention resides in the provision at the rear face of the sealing member of an annular rim which presents a sharp inner edge limiting the inward spread of the meniscus across the rear face of the sealing member. The radial spacing between the said edge and the interior surface of the reservoir should preferably be less than 0.65 mm.

The foregoing and other features of the invention are incorporated in the constructions that will now be described with reference to the accompanying drawings in which Figures 1 and 2 illustrate a reservoir writing instrument equipped with a reservoir according to this invention, when in the writing and inverted or carrying attitudes respectively;

Figures 3 and 4 are like views showing a modified arrangement of reservoir, while Figures 5 and 6 are like views showing a further modification in which the change in buoyancy is effected by means of a gas bubble.

Figure 7 is a longitudinal section through a reservoir writing instrument according to this invention or through a unit which (being complete with reservoir and writing extremity) may be employed as a re-fill in a writing instrument;

Figure 8 is a cross section taken on the line VIII—VIII in Figure 7;

Figure 9 is a longitudinal section through part of the reservoir and its sealing member, while Figures 10 and 11 are longitudinal views through the rear end of a reservoir illustrating arrangements which may be adopted for the purpose of preventing capillary creep.

In the accompanying drawings Figures 1 to 6 are largely diagrammatic and the writing instrument itself is not shown in any detail for the general construction of instruments of the type specified is now well understood. The instrument comprises a reservoir 1 of cylindrical form attached to a writing extremity 2 incorporating a writing ball 3 rotatably housed in and partly protruding from a socket or housing, this ball being fed from the reservoir by a small bore feed duct 4.

The reservoir 1 is of substantial capacity and leakage of ink is prevented by a device consisting of two superimposed members 5, 6. The member 5 which is uppermost when the instrument is in the writing attitude (Figure 1) is the sealing member aforesaid and has a positive buoyancy (i. e. is capable of floating on the surface of a wide expanse of the ink). It is of cylindrical exterior configuration and is a sliding fit in the interior of the reservoir, like a piston. The lowermost member 6 is the balancing member and is heavier than ink so that it tends to sink when submerged in ink. That is to say the sealing member 5 has a bulk density which is less than, and the balancing member 6 has a bulk density which is greater than, that of the ink. When the instrument is in the writing attitude, the member 5 will be relieved of the weight of the member 6 and will therefore float. When the instrument is inverted to the carrying attitude however, in which the member 5 is lowermost, the member 6 descends through the ink until it rests on top of the member 5. Therefore the sealing device conjointly formed by the members 5, 6, has no buoyancy i. e. no tendency to rise through the ink.

The member 6 is shown in the form of a hollow cylinder but it will be appreciated that it may be of any shape, so long as its shape is such that it can freely move from one end of the reservoir to the other and such that when the instrument is in the writing attitude it does not block the feed duct 4. The reservoir tube 1 may be open at its rear end, but preferably it is closed by a plug 7 provided with a vent hole 8.

The majority of inks likely to be used in ball point writing instruments of the type specified will have a density of approximately 1 gram/cc. and a surface tension of about 35 dynes per cm. As a result of experiments it has been found that the following values are satisfactory:

| Radial Clearance (in mm.) | 0.1 | 0.15 | 0.2 |
|---|---|---|---|
| Length of member 5 (in mm.) | 35 | 22 | 17.5 |

These are given merely by way of example.

It is assumed that the clearance or gap width is uniform over the whole length of member 5. For best results the clearance or gap indicated by the dimension X in Fig. 9 should lie between 0.01 mm. and 0.2 mm. and is preferably between 0.05 mm. and 0.08 mm. Moreover, the inner edge of the piston skirt indicated at 9 in Fig. 9 should be quite sharp and the distance between this edge and the interior surface of the reservoir as indicated by the dimension Y in Fig. 9, should preferably be less than 0.65 mm.

In addition the following condition should also be specified: weight of member 5 in liquid < weight of member 6 in liquid.

The weight in air is the normal weight as obtained on a balance. The weight in liquid is less and takes into account the buoyancy due to the displacement of the liquid by the member.

The sealing member 5 may be constructed of any plastic that is not attacked by and does not swell in oleaginous liquids, or any comparatively light material such for example as aluminium and its various alloys. A particularly suitable alloy is that which is sold under the registered trade-mark "Duralumin."

The bulk density of the sealing member or piston should not exceed 0.9 gr./cc. and the following are examples of sealing members or pistons intended for use in a reservoir of 5 mm. internal diameter.

*Example 1*

Material.—Casein:
Length of piston, mm _____ 9.5
Outside diameter, mm _____ 4.85
Weight, gr _____ 0.092
Bulk density, gr./cc. _____ 0.525

*Example 2*

Material.—that sold under the registered trademark "Duralumin":
Length of piston, mm _____ 9.0
Outside diameter of piston, mm _____ 4.85
Weight of piston, gr _____ 0.135
Bulk density, gr./cc _____ 0.80

The balancing member employed with the piston of Example 1 or Example 2 may consist of a lead shot having an average diameter of 4 mm. and weight 0.4 gr. (bulk density 11.4 gr./cc.) or a steel ball having a nominal diameter of 5/32″ (about 4 mm.) and a weight of 0.26 gr. (bulk density 7.9 gr./cc.) but more than one ball may be employed providing that the total weight does not exceed 0.6 grs.

Such a steel ball or lead shot is indicated at 6c in Fig. 7, but particulars as to weight also apply to an annular balancing member of the shape shown at 6 in Figs. 1 and 2 when made of lead or steel. In order to prevent such a ball obstructing the ink flow through the duct 4, the end wall of the reservoir may be cut across with a groove 10, Figs. 7 and 8.

It is not essential that the lighter one of the two members shall be uppermost when the instrument is in the writing attitude and Figures 3 and 4 illustrate a construction in which the lighter member is lowermost. In these figures the balancing member 6a has a positive buoyancy and the sealing member 5a has a less buoyancy and preferably a negative buoyancy. In the writing attitude, Figure 3, the member 6a will float on top of the ink and will support member 5a, the conjoint buoyancy of these two members therefore being positive. When the device is inverted to the writing attitude the member 6a (having a positive buoyancy) rises through the ink and therefore leaves the member 5a (having negative buoyancy) at the bottom of the ink column.

The balancing member 6a is conveniently constituted by a bubble of air or other gas enclosed in a very thin walled shell. The shell may be manufactured by a bubble-blowing technique, employing a film-forming synthetic resin such for example as polyvinyl alcohol.

It will be noticed that the sealing member 5a is shown as being of solid construction indicating the use of a material having a density slightly greater than that of the ink. The rear end of this sealing member 5a is provided with an annular rim 11 the inner edge 9 of which is sharp and is spaced from the interior wall of the reservoir as already described with reference to Figs. 1 and 2.

It is within the scope of the invention to employ a bubble of air, or gas which is not enclosed in a shell, as indicated at 6b in Figs. 5 and 6. If such an arrangement is adopted the entry to the feed duct 4 must be kept comparatively small (for example not more than 1 mm. in diameter) to prevent the air bubble from entering it. Alternatively however, there is provided at the entry to the feed duct 4 a filter or trap which affords little resistance to the passage of ink devoid of bubbles so that an adequate supply of ink by the writing ball 3 can be maintained, but is capable of resisting or preventing the passage of gas bubbles. This filter or trap is shown as consisting of a porous plug 12, this plug having approximately 50% porosity and a pore size of approximately 0.1 mm. (50% porosity means that the total pore volume of the material is 50% of the total bulk volume of the material). Fundamentally any porous material in which the pores are in communication with one another, in which the porosity is sufficiently high, and in which the pore size is sufficiently large, will be suitable if it is chemically inert with regard to the ink. Examples are porous plastics, various sintered materials, and even sintered glass.

It will be noted that in the nib down position; e. g., in Fig. 5, an air bubble may hold up a solid plug, i. e., that the downward force of gravity due to the immersed plug can be made lower than the upward force of buoyancy due to the air bubble.

It will readily be appreciated from the drawing that it is not difficult so to arrange the members that the volume of the plug is approximately equal to that of the air bubble. Assuming this to be the case, the relative gravity forces are evidently equal to the relative density of the two members in ink. There is no difficulty in providing a plug with a bulk density a little higher than that of the ink. However, if it is assumed that the density of the plug is as high as 1.3 (as in the example given in the description herein), then, with the density of ink at 1.0, the downward force exercised by the plug, per unit volume, is equal to the difference in density, i. e., 1.3−1.0=0.3 gr./cc.

The same applies to the bubble, i. e., its lifting force per unit volume is equal to the difference in the densities between ink and air, which is 1.0−0.0013=approximately 1.0. The buoyancy of the air bubble is, therefore, more than 3 times larger than the weight of the plug in ink. Hence, even if the volume of the air bubble were half of the plug there would still be an excess of buoyancy. It will be noted that the density in ink of the bubble and of the plug is different from the density in air.

Only the most violent shocks would make any impression on a single large bubble floating in our inks. Any air bubble entering the filter would immediately create menisci of very small curvature in the interstices of the filter. The corresponding capillary forces are such that they could not be overcome by the small gravity force of the ink column in the reservoir. The latter is, however, large enough to force pure-air-free ink through the filter at the required rate against the frictional resistance of the filter.

In other words, the air is not prevented from passing due to its frictional resistance or to the size of the air bubble but entirely due to the capillary resistance which is automatically built up when it tries to enter the interstices of the filter.

The following example is applicable to a construction shown in Figs. 3 and 4 and that shown in Figs. 5 and 6:

*Example 3*

Internal diameter of reservoir, 6 mm.
Material of sealing member 5a a synthetic resin having a density of about 1.3 gr./cc.
Length of sealing member, not exceeding 6 mm.
Diameter of sealing member, 5.85 mm.
Diameter of bubble 6a or 6b (the bubble being assumed to be spherical), 5 mm.

It is to be emphasised that a construction such as is shown in Figs. 1, 2 and 7 wherein the balancing member is heavy is preferable to constructions such as are shown in Figs. 3, 4, 5 and 6 wherein the balancing member is light.

If the interior surface of the reservoir 9 has any longitudinal imperfections in the nature of longitudinal scratches these scratches function as fine capillary ducts and there is a slight tendency for the ink to creep along them—a phenomenon known as capillary creep. While the tendency for the ink to creep out at the rear end of the reservoir may be minimised by providing the vent 8 in plug 7a which, as shown in Fig. 7, has a conical inner extremity so as to present a sharp edge at the inner end of the vent 8, the capillary creep is preferably prevented by arrangements and as illustrated in Figs. 10 and 11 respectively. According to Fig. 10 the interior of the reservoir near the plug 7 is provided with a plurality of annular grooves 13 presenting sharp edges at the inner surface of the reservoir. Each groove may be V-shaped, having an included angle of 60° and a depth of 0.5 mm. According to Fig. 11 the interior of the reservoir is formed with a series of shoulders 14 presenting sharp edges, the depth of each shoulder being preferably at least 0.25 mm.

The reason why the sharp edges prevent capillary creep along the length of the reservoir is as follows:

When a liquid film is creeping along a surface, the surface tension of that film resists any tendency to a sudden change in direction because in order for it to move over an edge the film surface has to become strongly curved. Such a curvature can only be produced if the liquid at this point is at a pressure higher than atmospheric pressure. Such a high pressure can only be produced by force of gravity (in which case the liquid must first accumulate) or by shocks or the like. It will therefore be apparent that the sharper the edge the more abrupt must be the change in direction and the smaller the radius of curvature, and therefore the greater reluctance on the part of the film to move over the edge.

It will readily be appreciated that these constructions render the dimensions and weights of the members 5 and 5a much less critical, for it is quite easy so to arrange matters that permissible size and weight variations are within the range of ordinary good manufacturing tolerances.

I claim:

1. A writing instrument of the type specified, comprising a ball writing end, a reservoir connected to the writing end, said reservoir being of tubular internal form with a cross sectional area of not more than 40 and not less than 5 sq. mm., said reservoir being adapted to contain ink of a viscosity of not less than 15 poises at 37° C., a reservoir-sealing member in the reservoir forming a sliding fit in the reservoir with the inner wall thereof, said member being adapted to normally move inside said reservoir in contact with the ink as the latter is used up in writing, a balancing member between the ball writing end and the sealing member, said balancing member being movable in the ink in the reservoir and having such a bulk density, that it cooperates with the sealing member, when necessary, to compensate, in any position of the writing instrument, any tendency of the sealing member to move through said ink toward the writing point.

2. Apparatus according to claim 1, wherein the radial clearance between the sealing member and the interior surface of the reservoir is between 0.01 mm. and 0.20 mm. and is preferably between 0.05 mm. and 0.08 mm.

3. An instrument according to claim 1, wherein the said balancing member moves towards and away from the sealing member, under the influence of gravity as the attitude of the instrument is changed.

4. A reservoir writing instrument of the type specified, having a smooth tubular reservoir of suitable cross-sectional area, containing a continuous column of suitable ink and a sealing member which is a sliding fit in the reservoir and has a bulk density less than that of the ink, and a balancing member which is located in the ink column and has a bulk density greater than that of the ink, the combination being such that, when the instrument has its ball tip downwards the sealing member floats separate from the balancing member in a suitable position at the end of the ink column remote from the ball tip, and when the instrument has its ball tip upwards, the sealing member is held down by the balancing member in a suitable position at the end of the ink column remote from the ball tip.

5. A writing instrument of the type specified, comprising a ball writing end, a tubular element connected to the writing end, said element containing a suitable ink, a sealing member in said element at the end of the ink remote from the ball, forming a sliding fit in the element, and adapted to normally move along the element in contact with ink as the latter is used in writing, said sealing member having a bulk density differing from that of the ink, and a balancing member independently movable in the element and having such a bulk density that it cooperates with the sealing member, when necessary, to compensate, in any position of the writing instrument, any tendency of the sealing member to move through said ink toward the writing point.

6. A reservoir writing instrument according to claim 5 wherein the sealing member in the reservoir forming a sliding fit therein has a bulk density greater than that of the ink, and the balancing member is intermediate the sealing member and the writing end of the instrument disposed in the ink column, said balancing member having a bulk density less than that of the ink, the combination of the sealing member and the balancing member being such that when the instrument has its ball tip downwards the sealing member is held up by the balancing member in a suitable position at the end of the ink column remote from the ball tip, and when the instrument has its ball tip upwards, the sealing member is maintained separate from the balancing member in a suitable position at the end of the ink column remote from the ball tip.

7. Apparatus according to claim 6, wherein the sealing member has an annular rim at its rear face forming a sharp inner edge limiting the inward spread of the meniscus of the ink contained in the reservoir.

8. Apparatus according to claim 6, wherein the radial spacing between said edge and the interior surface of the reservoir is less than 0.65 mm.

9. Apparatus according to claim 6, wherein the sealing member is in the form of a skirted piston and the edge is the inner edge of the piston skirt.

10. In a writing instrument of the ball point type, the improvement comprising a suitable ink containing reservoir of tubular internal form having an internal cross sectional area of not more than 40 and not less than 5 sq. mm., a ball writing end in connection with the reservoir, a reservoir-sealing member having a bulk density not exceeding about 0.9 gr./cc. in the reservoir forming a sliding fit therein, said sealing member being adapted to float on the ink in the reservoir and being normally remote from the ball writing end when said end is in writing position and a balancing member in the reservoir which is free to move in the ink in the reservoir, said balancing member having a bulk density between 7.9 gr./cc. to 11.4 gr./cc. and differing from that of the sealing member, the construction and disposition of the parts being such that, when the reservoir is charged with a suitable ink of a density intermediate the bulk densities of the sealing and balancing members, a meniscus is formed between the sealing member and the inner surface of the reservoir and the sealing member is maintained in stable eqilibrium at that end of the ink column remote from the ball in all attitudes of the instrument.

11. A reservoir writing instrument, according to claim 10, having an oleaginous ink of a viscosity of not less than 15 poises at 37° C.

12. A writing instrument of the ball point type comprising a ball writing end, a reservoir in connection with said end for containing a suitable writing ink, said reservoir having aperture means therein for communication with the atmosphere to permit flow of ink therein toward the writing end, a slidable sealing member for said reservoir conforming with the shape of the reservoir and adapted to slide with the ink in said reservoir and forming a sliding fit with respect to the wall thereof, said sliding member being of less density than that of the ink in said reservoir, a compensating balancing member for the ink in said reservoir, independently slidable in the reservoir approximating the diameter of the reservoir and being adapted to move in the ink in said reservoir when the instrument is disposed in a writing and non-writing position.

13. A writing instrument of the ball point type comprising a ball writing end, a reservoir in connection with said end for containing a suitable writing ink, and having means for communication with the atmosphere, a sealing member conforming with the shape of the reservoir and adapted to slide in said reservoir forming a sliding fit with the wall thereof, said member being adapted to float on the ink and being provided with a skirted edge to prevent capillary creep of the ink over the sealing member, and a compensating balancing member in the reservoir approximating the diameter of the reservoir said balancing member being independently movable in the ink in the reservoir, said balancing member being heavier than the ink in the reservoir, and adapted to move in the direction of the sealing member when the instrument is in an upright non-writing position, said sealing and balancing member forming a seal at the end of the ink column in the reservoir when the instrument is in a non-writing position.

14. A writing instrument of the ball pen type comprising a ball point writing end, a reservoir for containing a suitable ink therein connected at one end to said writing end, said reservoir having its other end in communication with the atmosphere, sealing means for the interior of the reservoir adapted to form a sliding fit therewith and having a positive buoyancy with respect to the ink in the reservoir, and balancing means in the reservoir having external dimensions approximating the internal dimensions of the reservoir, adapted to slide in the reservoir, said last means being heavier than the ink in the reservoir and being adapted with the sealing means to form a seal at the end of the ink column in the reservoir when the instrument is in normal upright condition.

15. An apparatus for applying a fluent material to an underlying surface, including a tubular body forming a fluent material reservoir and having at one end a writing tip, a follower piston having buoyant properties in relation to the fluent material freely slidable in the tubular body to follow the fluent material therein, and a weight in the tubular body movable by gravity therein independently of the follower piston, said weight adding its weight to the follower piston to prevent floating of the follower piston when the tubular body is turned to dispose the writing tip upwardly, and said weight moving in the reverse direction to remove its weight from the follower piston when the tubular body is turned to dispose the writing tip downwardly in operative position.

16. A writing instrument, according to claim 5, wherein the sealing member has a bulk density greater than that of the balancing member and wherein the balancing member is a bubble in the ink.

17. In a writing instrument of the ball point type, the improvement comprising a suitable ink containing reservoir of tubular internal form having an internal cross sectional area of not more than 40 and not less than 5 sq. mm., a ball writing end in connection with the reservoir, a reservoir-sealing member in the reservoir forming a sliding fit therein, said sealing member being adapted to float on the ink in the reservoir and being normally remote from the ball writing end when said end is in writing position and a balancing member in the reservoir which is free to move in the ink in the reservoir, said balancing member having a bulk density differing from that of the sealing member, the construction and disposition of the parts being such that, when the reservoir is charged with a suitable ink of a density intermediate the bulk densities of the sealing and balancing members, a meniscus is formed between the sealing member and the inner surface of the reservoir and the sealing member is maintained in stable equilibrium at that end of the ink column remote from the ball in all attitudes of the instrument.

HANS REINHARD FEHLING.

References Cited in the file of this patent

UNITED STATES PATENTS

| Number | Name | Date |
|---|---|---|
| 2,192,479 | Nissen | Mar. 5, 1940 |
| 2,194,348 | Zoder | Mar. 19, 1940 |
| 2,249,163 | Nissen | July 15, 1941 |
| 2,427,069 | Randolph | Sept. 9, 1947 |
| 2,438,786 | Moore | Mar. 30, 1948 |